United States Patent [19]

Kurihara et al.

[11] Patent Number: 4,733,230
[45] Date of Patent: Mar. 22, 1988

[54] METHOD OF DISPLAYING CONTINUOUS TONE PICTURE USING LIMITED NUMBER OF DIFFERENT COLORS OR BLACK-AND-WHITE LEVELS, AND DISPLAY SYSTEM THEREFOR

[75] Inventors: Tsuneya Kurihara, Kodaira; Akio Yajima, Suginami, both of Japan

[73] Assignee: Hitachi, Ltd., Tokyo, Japan

[21] Appl. No.: 769,307

[22] Filed: Aug. 26, 1985

[30] Foreign Application Priority Data

Sep. 6, 1984 [JP] Japan ................... 59-185344

[51] Int. Cl.$^4$ ............................................. G09G 1/16
[52] U.S. Cl. ................................... 340/728; 340/793; 340/703; 358/283
[58] Field of Search ............. 340/701, 703, 728, 793; 358/283

[56] References Cited

U.S. PATENT DOCUMENTS

| | | | |
|---|---|---|---|
| 4,245,258 | 1/1981 | Holladay | 358/283 |
| 4,516,118 | 5/1985 | Wahlquist | 358/283 |
| 4,577,235 | 3/1986 | Kannapel et al. | 358/283 |

OTHER PUBLICATIONS

*Survey of Techniques for the Display of Continuous Tone Pictures on Bilevel Displays;* Jarvis et al; Computer Graphics & Image Processing 5, 13–40 (1976).
*An Adaptive Algorithm for Spatial Grey Scale;* Floyd et al, SID 75 Digest, pp. 36–37.

*Primary Examiner*—Marshall M. Curtis
*Attorney, Agent, or Firm*—Antonelli, Terry & Wands

[57] ABSTRACT

A displayable color which is the nearest to a desired display color (the synthesis of the color of an original image and an error distributed by the preceding processing) for a particular picture element which is being processed on a scan line (or the picture element which is presently the object of processing) is selected, the displayable color is supplied to a display portion, and the error between the selected displayable color and the desired display color is distributed to those picture elements which are on un-processed scan lines among the group of picture elements in the proximity of the particular picture element by assigning a suitable weight thereto. The processing of the particular picture element may be executed in parallel with a plurality of picture elements on the scan line which is being processed.

11 Claims, 7 Drawing Figures

| NO | R | G | B |
|---|---|---|---|
| 1 | $R_1$ | $G_1$ | $B_1$ |
| 2 | $R_2$ | $G_2$ | $B_2$ |
| 3 | $R_3$ | $G_3$ | $B_3$ |
| ⋮ | ⋮ | ⋮ | ⋮ |
| n | $R_n$ | $G_n$ | $B_n$ |

42

METHOD OF DISPLAYING CONTINUOUS TONE PICTURE USING LIMITED NUMBER OF DIFFERENT COLORS OR BLACK-AND-WHITE LEVELS, AND DISPLAY SYSTEM THEREFOR

BACKGROUND OF THE INVENTION

This invention relates to the display of a pseudo-continuous tone image in a display device having only a limited number of discontinuous displayable colors.

It is possible to produce a display image (a pseudo-continuous tone image) which, though the number of colors that can be displayed is small, provides the effect as if colors of intermediate tones were also displayed, by utilizing the spatial integration characteristics of the sense of human sight. This can also be accomplished when a display device is employed in which the number of intensity levels for monochromic or black-and-white images is limited. The term "color" used herein means not only the colors in a multi-color display device but also the intensity levels of a monochromic or black-and-white display device.

A continuous tone can not be sufficiently displayed if the colors of an original image (an input image) are quantified at a predetermined threshold level. Therefore, in a pseudo-continuous tone display, the color of each picture element is compared with a threshold value which is calculated in accordance with a certain rule, in order to determine a display color. Such a method is generally referred to as the "dither" method. Various dither methods are known in the art. (For example, refer to "A Survey of Techniques for the Display of Continuous Tone Pictures on Bilevel Displays", Computer Graphics and Image Processing, May, 1976, pages 13-40.) Typical examples of these dither methods are an ordered dither method and an error diffusion method. In the ordered dither method, the threshold value for quantifying the original image is determined solely in accordance with the coordinate information of the picture element to be displayed. Generally, this method regards the picture surface as an aggregate of n×n sub-matrices, and uses as the coordinate information a value representing one side n of the matrix as module n. (Refer to the reference described above.)

Though the quantity of necessary calculation can be reduced by the ordered dither method, the method involves the problems in conjunction with the smoothness of the image and the spatial resolution. Another problem is that a particular pattern appears on the picture surface.

The error diffusion method, however, compensates for the error between the color of an original image (input image) in a certain picture element and the color that is most approximate to the former and can be displayed, by weighting and distributing not-determined picture elements (pixels) close to the original color as will be described later in further detail. Though fine, particular crease patterns appear on the picture surface, the error diffusion method provides satisfactory smoothness and spatial resolution. However, since the quantity of calculation is great, this method involves the problem of a long processing time (which is some dozens of multiples of the processing time of the ordered dither method). Furthermore, since the result of processing of each picture element affects sequentially the content of processing of not-determined pixels as will be described later, it is difficult to accomplish parallel processing to reduce the processing time. This is the most crucial problem with this method.

SUMMARY OF THE INVENTION

The present invention is directed to accomplish the display of pseudo-continuous tone images based upon the principle described above in a shorter processing time and with a sufficiently high level of quality.

From the aspect of a method of processing one picture element, the present invention corresponds to a method which is obtained by modifying the error diffusion method and limits the places of error distribution to the picture elements on scan lines after the scan line which is now being processed. In other words, the present invention selects a displayable color which is the nearest to a desired display color (the synthesis of the color of the original image and the error distributed by the preceding processing) for a particular picture element which is being processed on a scan line (the picture element which is presently the object of processing), supplies the displayable color to a display portion, and distributes the error between the selected displayable color and the desired display color to those picture elements which are on unprocessed scan lines among the group of picture elements in the proximity of the particular picture element by assigning a suitable weight thereto, but the present invention does not distribute the error to the adjacent picture elements on the scan line which is now being processed.

Another characterizing feature of the present invention resides in parallel processing. That is, the processing of the particular picture element described above is executed in parallel with a plurality of picture elements on the scan line which is now being processed. This method can drastically shorten the processing time, but since the processing of the particular picture element does not affect the desired display colors of the subsequent picture elements on the same scan line, parallel processing described above can be accomplished easily.

BRIEF DESCRIPTION OF THE DRAWINGS

FIG. 3 is an explanatory view useful for explaining an error diffusion method;

FIG. 4 is an explanatory view useful for explaining a corrected error diffusion method as the basis of the present invention;

DESCRIPTION OF THE PREFERRED EMBODIMENTS

Figure 1:
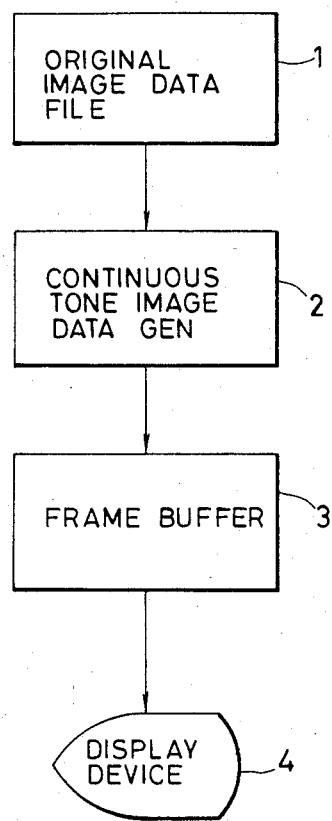
FIG. 1 is a block diagram showing an example of a display device to which the present invention is applied.

FIG. 1 shows an example of a schematic construction of a display device to which the present invention is applied. Original image data stored in a memory 1 is processed one scan line at a time and is converted to pseudo-continuous tone data by a parallel continuous data generator 2, and the result is stored in a frame buffer 3. A display device 4 displays the pseudo-continuous tone image in accordance with the content of the frame buffer 3.

The parallel continuous tone data generator 2 executes processing which constitutes the gist of the present invention. A conventional error diffusion method will be described with reference to FIG. 3 before the processing of the present invention is described in detail. (Refer, for example, to "An Adaptive Algorithm for Spatial Gray Scale" by Floyd et al, SID 1975, Int. Symp. Dig. Tech. Paper, p.p. 36–37.)

Figures 3, 4:
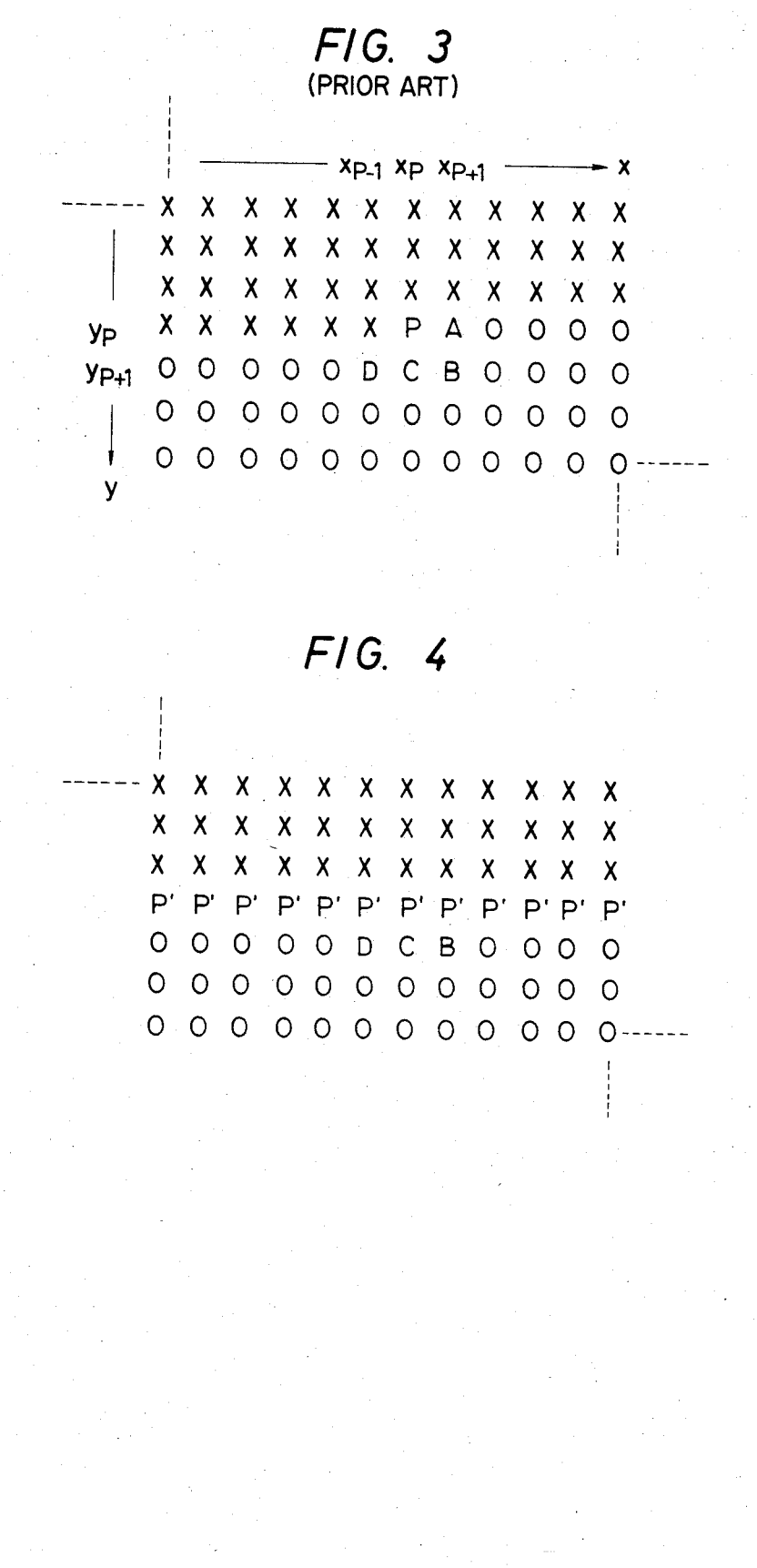

In FIG. 3, X represents those picture elements for which processing has already been made and whose colors have been determined. Symbol P represents a specific picture element whose display color is now to be decided. Symbols A through D represent those picture elements which are in proximity to P and whose display colors are yet to be determined. Symbol 0 represents other picture elements whose display color is not yet determined.

The coordinates of the specific picture element P whose color is to be now determined are expressed as $(X_p, Y_p)$, and the color data of the desired display color is expressed as $I(x_p, y_p)$. (The color data is that of the original image for the first picture element throughout the picture surface, but is generally that color data which is expressed by the sum of the color data of the original image and the quantifying error distributed from the processed picture elements in the manner described elsewhere.) Here, $I(x_p, y_p)$ represents the intensity level in the case of a monochroic or black-and-white image and each component R, G, B in the case of a color image.

The color data $F(x_p, y_p)$ which is selected for a picture element P and is displayable is given by the following equation when the function that gives the nearest displayable color to a desired color is expressed by best (I):

$$F(x_p, y_p) = \text{best}[I(x_p, y_p)] \quad (1)$$

This $F(x_p, y_p)$ is stored at the position of the picture element P in the frame buffer 3. The error E due to the quantitization is given by:

$$E = I(X_p, Y_p) - F(x_p, y_p) \quad (2)$$

The error E is distributed to the not-determined picture elements near the picture element P, that is, $A(x_{p+1}, y_p)$, $B(x_{p+1}, y_{p+1})$, $C(x_p, Y_{p+1})$, $D(x_{p-1}, y_{p+1})$, by multiplying them by their respective weighting coefficients $k_A$, $k_B$, $k_C$ and $k_D$. In other words, if the original image colors of these picture elements are expressed by I', they can be changed as follows:

$$I(x_{p+1}, y_p) = I'(x_{p+1}, y_p) + k_A E \quad (3)$$

$$I(x_{p+1}, y_{p+1}) = I'(x_{p+1}, y_{p+1}) + k_B E \quad (4)$$

$$I(x_p, y_{p+1}) = I'(x_p, y_{p+1}) + k_C E \quad (5)$$

$$I(x_{p-1}, y_{p+1}) = I'(x_{p-1}, y_{p+1}) + k_D E \quad (6)$$

The coefficients $k_A$ through $k_D$ are selected so that their sum is 1, and increases as the distance from the particular picture element P to the nearby picture element(s) decreases. However, this decision is largely based on trial and error, and is not very precise. The following is one example:

$k_A = 7/16$, $k_B = 1/16$, $k_C = 5/16$, $k_D = 3/16$,

The range of distribution of the quantifying error may be expanded up to the not-determined picture elements on the right and left sides and at the lower portions of FIG. 3.

In accordance with the ordered dither method, quantifying is made only by the threshold which is primarily determined by the position of a given picture element. It is evident that, the quantity of required calculation of the error diffusion method described above is extremely great in comparison with the ordered dither method. It is generally assumed that this problem can be solved by parallel processing. Under the algorithm described above, however, it is extremely difficult to accomplish parallel processing, because the result of processing of each picture element sequentially affects the processing content of undetermined picture elements. As can be seen particularly clearly from the relation of the formulas (2) and (3), the desired display color in FIG. 3 is not determined until the display color of the next picture element on the left side is determined and its quantifying error is distributed. The desired display color of that next picture element on the left side depends further upon the result of processing of the picture element still next on the left side, and this relation continues to the extreme left.

Therefore, processing must be effected sequentially for one picture element at a time from the left side to the right side on the scan line. Even if a plurality of processing circuits are disposed in parallel with one another, processing time can not be shortened substantially.

The present invention is based upon the modification of the algorithm already described. FIG. 4 is a schematic view which is useful for explaining the modification in accordance with this invention. In the drawing, like reference symbols are used as in FIG. 3. The displayable color which is the nearest to the desired display color of the particular picture element P is selected in the same way as in the conventional method. The method of the present invention is characterized in that the quantifying error in the particular picture element P is limited to the near picture elements on the scan line to be processed next and so on (B, C and D in this example), but is not distributed to the picture elements on the same scan line as the particular picture element P (e.g., A in FIG. 3). In other words, only formulas (4) through (6) are employed but formula (3) is excluded. The range of distribution of the quantifying error can be expanded arbitrarily as far as the picture elements on an unprocessed scan line are concerned. Thus, the other picture elements P' on the same scan line as the particular picture element P can be processed simultaneously.

The distribution coefficients $k_B$, $k_C$, $k_D$ of the quantifying error are not as critical in the same way as in the conventional method, but are determined simply so that their sum is 1 and are inversely proportional to the reciprocal of the distance from the particular picture element. According to this rule, they may be determined in the following way:

$$k_B = (2 - \sqrt{2})/2$$

-continued $$k_C = \sqrt{2} - 1$$

$$k_D = (2 - \sqrt{2})/2$$

Alternatively, they may be determined approximately in the following way:

$k_B = 5/16$, $k_C = 6/16$, $k_D = 5/16$,

In the case of color display, the same processing is carried out for each of the R, G and B components.

In accordance with the present method, the range of distribution of the quantifying error varies somewhat in comparison with the conventional method, but experimental results illustrate that the reduction of the quality of the display is hardly a problem.

Figure 2:
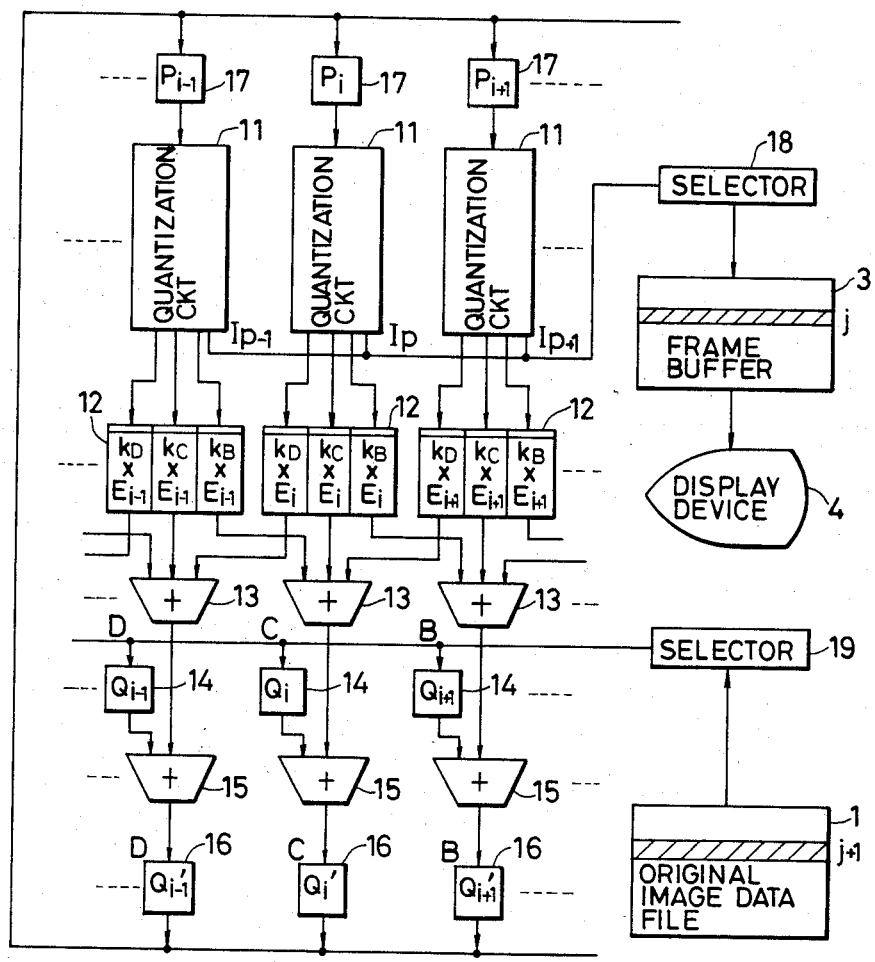
FIG. 2 is a more detailed block diagram of FIG. 1.

FIG. 2 particularly shows the definite example of the parallel continuous tone data generator 2 in the construction of FIG. 1. However, only the ith particular picture element $P_i$ and its near picture elements $P_{i-1}$, $P_{i+1}$ are shown as representatives, and a large number of similar circuits are disposed in parallel in practice for other picture elements.

The original image data inside the memory 1 (consisting of data representing the R, G and B components for each picture element,) are sequentially read out one scan line at a time by a selector 19 and are sent to a register 14. The register 14 holds all the image data on one scan line for a period of one processing cycle, and the content is sent to a register 17 having the same capacity through a register 16 after receiving the distribution of the quantifying error from the scan line which is under processing, as will be later described. After the content of the register 14 is processed, the register 14 sends it to the register 16 and then receives the image data of the next scan line. Therefore, when viewed from the register 14, the register 17 holds the image data of one previous scan line, and this becomes the object of display color determination processing. In other words, the content of the register 17 is the desired display color data of the particular picture element (P' in FIG. 4) on the scan line j which is under processing, and the content of the register 14 corresponds to the picture elements (D, C, B in FIG. 4) on the next scan line j+1. Next, processing of these representative picture elements will be described.

Each quantifying circuit 11 selects the color data of the displayable color which is the nearest to the color data $I_p$ of the desired display color of the particular picture element $P_i$ among the displayable colors, though the detail will be given elsewhere, and writes its color number into the corresponding picture element position in the frame buffer 3 through the selector 18. As will be described in detail elsewhere, the quantifying circuit 11 further writes the distribution quantity of the quantifying error $E_i$ into the register 12.

The quantifying error is determined for each color component (R, G, B). Here, the quantifying error for these three primary color components is expressed simply as $E_i$.

The distribution quantities of the quantifying error are applied to adders 13 corresponding to the picture elements at the lower left, immediately below and lower right positions, as shown in FIG. 2. In other words, the distribution quantity $k_D \times E_i$ of the quantifying error $E_i$ by the ith picture element $P_i$ for a picture element D is applied to the (i−1)th adder 13. Similarly, the distribution quantity $k_C \times E_i$ of the quantifying error $E_i$ by the ith picture element for a picture element C is applied to the ith adder 13, and the distribution quantity $k_B \times E_i$ by the ith picture element $P_i$ for a picture element B is applied to the (i+1)th adder 13. The adders 13 calculate the sum of the error distribution quantities from the picture elements at the upper left, immediate above and upper right positions. The error distribution quantity is also determined for each color component, and is calculated for each color component. Therefore an adder is necessary for each color component, but only one adder is shown disposed simply in the drawing.

The sum of these error distribution quantities is further added by an adder 15 to the original image color data $I_D'$, $I_C'$, $I_B'$ of the predetermined near color elements D, C, B on the scan line which is held by the register 14 and is to be next processed, and the modified desired display color data $I_D$, $I_C$, $I_B$ as a result are stored at the corresponding picture element positions in the register 16. Addition by the adder 15 is made for each color component. In this manner, the quantitization error is distributed. The processing described above is effected in parallel for all the picture elements inside the register 17, and after this processing has been completed, the content of the register 16 is transferred to the register 17 and the data of the next unprocessed scan line j+2 is read out in the register 14.

As the fundamental construction of the present invention, the afore-mentioned group of circuits 11–17 are disposed in parallel for all the picture elements on one scan line. If the desired processing speed is not very high, however, the number of juxtaposition may be reduced in order to execute the processing in a parallelo-series system. If the range of distribution of the quantifying error is expanded so as to reach still another scan line, a similar register is disposed at a pre-stage of the register 16 and a group of circuits 12–15 are disposed for the register.

Figure 5:
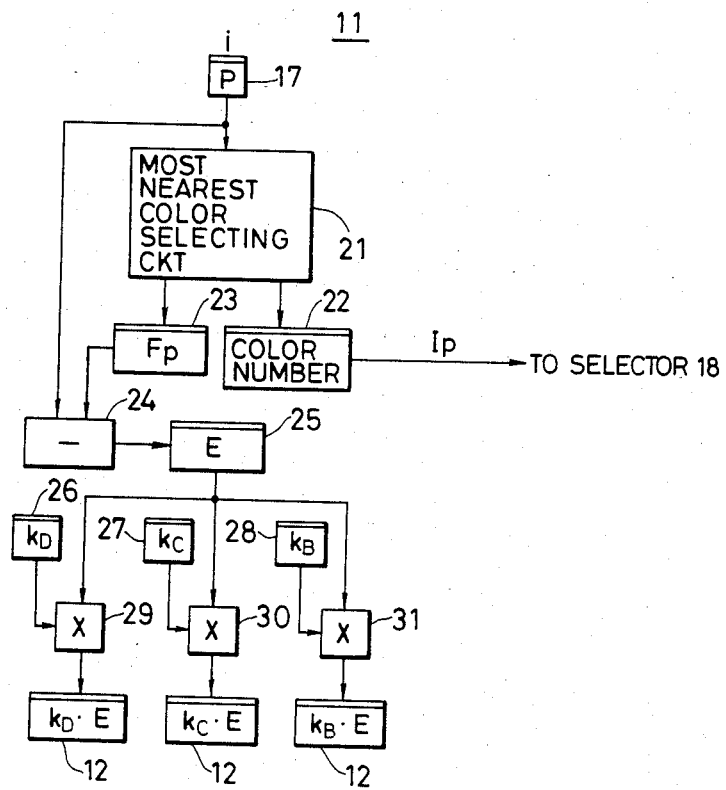
FIG. 5 is a block diagram showing a definite example of the construction of the quantifying circuit in FIG. 2.

An example of the internal construction of the quantifying circuit 11 is shown in FIG. 5. Though to be described in further detail elsewhere, a nearest color selecting circuit 21 selects the nearest color $F_p$ to the desired display color $I_p$ of the particular picture element P among the displayable colors, and sends its color number $G_p$ to a register 22 and its color data $F_p$ to a register 23. The color number will be described later in further detail. The color number $G_p$ sent to the register 22 is produced as a display color.

The color data $F_p$ of the display color sent to the register 23 is subtracted from the desired display color data $I_p$ of the particular picture element P by a subtracter 24, and the quantifying error E as its result is applied to a register 25. This subtraction is effected for each color component R, G, B, and the quantitization error is also determined for each color component.

Registers 26, 27 and 28 hold the quantifying error distribution coefficients $k_D$, $k_C$, $k_B$. These coefficients are multiplied by the quantifying error E in the register 25 by multipliers 29, 30 and 31, respectively, and the quantifying error distribution quantities as the result of multiplication are applied to the register 12.

Figures 6, 7:
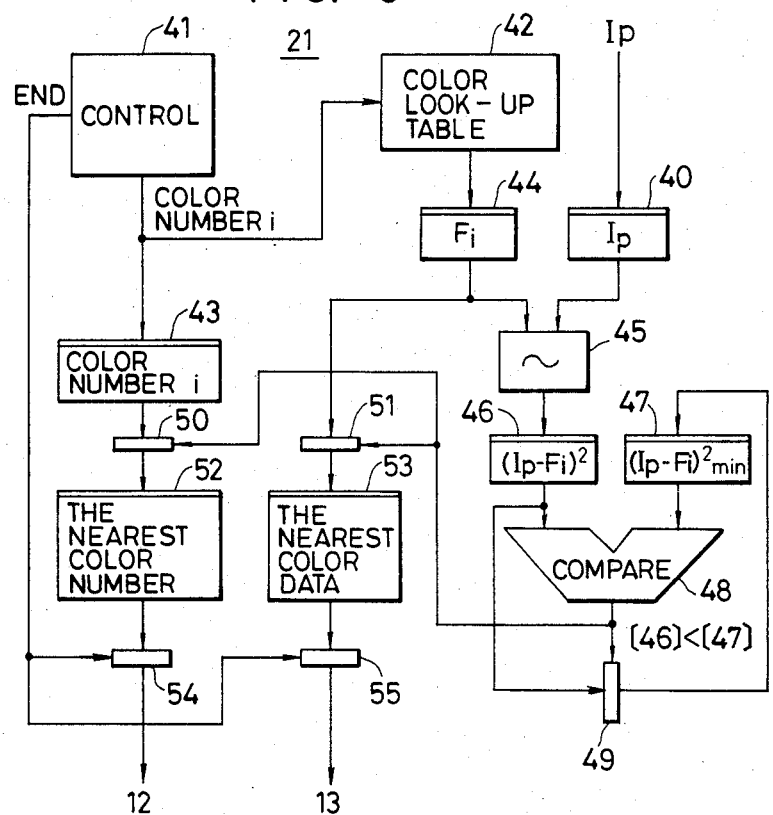
FIG. 6 is a block diagram showing a definite example of a nearest color selection circuit in FIG. 5.
FIG. 7 is a table tabulating the construction of a color loop-up table in FIG. 6.

FIG. 6 shows an example of the internal construction of the nearest color selecting circuit 21. The desired display color data $I_p$ of the particular picture element P is read out from the register 33 shown in FIG. 2 and is stored in a register 40. On the other hand, a controller 41 sequentially generates the color numbers i of the displayable colors, searches through a color look-up table 42 and temporarily records it in a register 43.

The color look-up table 42 is a table which holds the displayable colors, and is often used for displays having a limited number of displayable colors. It holds color data (R, G, B, etc.) corresponding to the color numbers. FIG. 7 shows the construction of the color look-up table.

The color look-up table 42 reads out to a register 44 the displayable color data $F_i$ which correspond to the color numbers given from the controller 41. In order to determine the color distance between the desired display color $I_p$ and the displayable color $F_i$ read out from the color look-up table, a calculator 45 calculates the sum of the square of the difference of the content $I_p$ of the register 40 from the content $F_i$ of the register 44 for each color component R, G, B, and applies the result to a register 46. A register 47 holds the smallest color distance in the past when viewed eventually, but a sufficiently large value is set to it in the initial state. A comparator 48 compares the content of the register 46 with that of the register 47, and sends a control signal to gates 49, 50 and 51 to turn them on when the former is smaller than the latter. As a result, the contents of the registers 43, 44 and 46 are sent to the registers 52, 53 and 47, respectively, to update their contents. Therefore, the registers 52, 53 and 47 always hold the color number, color data and color distance of the color which is the nearest to the desired display color among the displayable colors as the candidate colors up to that time. When the operation described above is repeated and all the displayable colors stored in the color look-up table are checked, the controller 41 generates a control signal to turn off the gates 54 and 55, thereby sending the contents of the registers 52 and 53 to the registers 12 and 13 shown in FIG. 2. The contents of the registers 52 and 53 at this time are nothing but the color number and color data of the displayable color which is the nearest to the desired display color.

In the case of monochromic or black-and-white images, the absolute value of the difference of the color data (luminance data) may be used as the color distance.

Unless the number of colors (the number of levels) of original image colors is extremely great, the circuit shown in FIG. 6 can be replaced as a whole by a table holding the color number and color data of the nearest displayable color that is calculated in advance in accordance with each input color data.

Though the embodiment described above uses the color look-up table, a method of storing the color data directly in the frame buffer may be possible.

The embodiment described above employs new and special hardware. As another form, however, a general-purpose pipeline processor or array processor which is programmed in such a manner as to execute the same processing as the group of circuits 11-30 in FIG. 2 may be used instead. Since the pipeline processor processes a next picture element before processing of one picture element is completed, processing time can be drastically reduced.

What is claimed is:

1. A method of displaying continuous tone images from input image value data signals representing respective image values of a respective picture element of picture elements forming a plurality of successive lines of an image to be displayed by parallel processing of lines in sequence, comprising the steps of:
    (a) comparing each of the input image value data signals forming a first line of said image with a plurality of standard value data signals each representing a respective one of a plurality of displayable image values and selecting for each input image value data signal the one standard value data signal which is closest to that input image value data signal;
    (b) calculating the quantifying error between each input image value data signal forming said first line of said image and the standard value data signal selected for each input image value data signal;
    (c) generating a respective compensation quantity for each input image value data signal of said first line of said image based on predetermined weighting coefficients and the quantifying error for that input image value data signal and the quantifying errors of a predetermined number of adjacent input image value data signals in said first line;
    (d) adding the generated compensation quantity for each input image value data signal of said first line only to an image value data signal of a second line of said image to be displayed to produce input image value data signals of said second line;
    (e) repeating steps (a) through (d) for all lines of input image value data signals following said first line until standard value data signals have been selected for the input image value data signals of all of the lines of said image; and
    (f) displaying said selected standard value data signals to produce the appearance of a continuous tone image.

2. A method according to claim 1, wherein said image value data signals indicate data representing the color of each picture element of a color image, and said standard value data signals represent displayable colors.

3. A method according to claim 2, wherein said step (c) comprises:
    (c1) selecting weighting coefficients for a plurality of adjacent color data signals;
    (c2) processing said quantifying error for each of said input color data signals with each of said selected weighting coefficients to produce quantified compensation values for adjacent color data signals; and
    (c3) adding the quantified compensation values for each input color data signal to produce said compensation quantity for each input color data signal.

4. A method according to claim 3, wherein said step (c1) comprises selecting weighting coefficients which add up to unity.

5. A method according to claim 4, wherein in step (c1) weighting coefficients are selected for three adjacent input color data signals.

6. The method of displaying continuous tone images as defined in claim 1 wherein said image value data signals indicate data representing the luminance of each picture element of a monochromic image.

7. The method of displaying continuous tone images as defined claim 1 wherein said image value data signals are data representing the luminance of each picture element of a black-and-white image.

8. The method of displaying continuous tone images as defined in claim 2 wherein said color data signals are data representing the quantity of each of a plurality of color components of a color image for each picture element.

9. A method of displaying continuous tone images from input color data signals representing each color of a respective picture element of picture elements forming a plurality of lines of an image to be displayed by parallel processing of lines in sequence, comprising the steps of:

(a) comparing each of the input color data signals forming a first line of said image with a plurality of standard color data signals each representing a respective one of a plurality of displayable colors and selecting for each input color data signal the one standard value data signal which is closest to that input image value data signal;

(b) calculating the quantifying error between each input color data signal forming said first line of said image and the standard color data signal selected for each input color data signal;

(c) generating a respective compensation quantity for each input color data signal of said first line of said image based on predetermined weighting coefficients and the quantifying error for that input color data signal and the quantifying errors of a predetermined number of adjacent input color data signals;

(d) adding the generated compensation quantity for each input color data signal of said first line only to a color data signal of a subsequent line of said image to be displayed to produce a compensated set of said input color data signals;

(e) repeating steps (a) through (d) until standard color data signals have been selected for the input color data signals of all of the lines of said image; and (f) displaying said selected standard color data signals to produce the appearance of a continuous tone image.

10. A method of displaying continuous tone images from input color data signals representing each color of a respective picture element of picture elements forming a plurality of successive lines of an image to be displayed by parallel processing of lines in sequence, comprising the steps of:

(a) comparing each of the input color data signals forming a first line of said image with a plurality of standard color data signals each representing a respective one of a plurality of displayable colors and selecting for each input color data signal the one standard value data signal which is closest to that input image value data signal;

(b) calculating the quantifying error between each input color data signal forming said first line of said image and the standard color data signal selected for each input color data signal;

(c) generating a respective compensation quantity for each input color data signal of said first line of said image based on predetermined weighting coefficients and the quantifying error for that input color data signal and the quantifying errors of a predetermined number of adjacent input color data signals in said first line;

(d) adding the generated compensation quantity for each input color data signal of said first line only to a corresponding color data signal of a second line of said image to be displayed to produce a compensated set of said input color data signals of said second line;

(e) repeating steps (a) through (d) until standard color data signals have been selected for the input color data signals of all of the lines of said image; and (f) displaying said selected standard color data signals to produce the appearance of a continuous tone image.

11. A system for displaying continuous tone images from input color data signals representing each color of a respective picture element of picture elements forming a plurality of successive lines of an image to be displayed by parallel processing of line in sequence, comprising:

means for comparing each of the input color data signals forming a first line of said image with a plurality of standard color data signals each representing a respective one of a plurality of displayable colors and selecting for each input color data signal the one standard color data signal which is closest to that input color data signal;

means for calculating the quantifying error between each input color data signal forming said first line of said image and the standard color data signal selected for each input color data signal;

means for generating a respective compensation quantity for each input color data signal of said first line of said image based on predetermined weighting coefficients and the quantifying error for that input color data signal and the quantifying errors of a predetermined number of adjacent input color data signals in said first line;

means for adding the generated compensation quantity for each input color data signal of said first line only to a corresponding color data signal of a second line of said image to be displayed to produce a compensated set of said input color data signals of said second line; and means for displaying said selected standard color data signals to produce the appearance of a continuous tone image.

* * * * *